(12) United States Patent
Schneider

(10) Patent No.: US 6,240,094 B1
(45) Date of Patent: May 29, 2001

(54) STATISTICAL TIME DIVISION MULTIPLEXER FOR A WIRELESS ASYMMETRIC LOCAL LOOP COMMUNICATION SYSTEM

(75) Inventor: Allan Schneider, Falls Church, VA (US)

(73) Assignee: Bell Atlantic Network Services, Inc., Arlington, VA (US)

( * ) Notice: Subject to any disclaimer, the term of this patent is extended or adjusted under 35 U.S.C. 154(b) by 0 days.

(21) Appl. No.: 08/996,339

(22) Filed: Dec. 22, 1997

(51) Int. Cl.[7] ............................. H04L 12/28; H04J 3/16
(52) U.S. Cl. ........................................ 370/412; 370/468
(58) Field of Search .................................. 370/235, 360, 370/416, 450, 468, 537, 538, 412, 413, 419, 420, 452; 348/387, 385, 419, 500

(56) References Cited

U.S. PATENT DOCUMENTS

| | | |
|---|---|---|
| 3,864,524 | 2/1975 | Walker . |
| 4,630,257 | 12/1986 | White . |
| 4,750,165 | 6/1988 | Champagne et al. . |
| 4,774,704 | 9/1988 | Gass et al. . |
| 4,899,337 | 2/1990 | Hirai . |
| 4,993,025 | 2/1991 | Vesel et al. . |
| 5,231,628 | 7/1993 | Boman . |
| 5,247,347 | 9/1993 | Litteral et al. . |
| 5,272,697 | 12/1993 | Fraser et al. . |
| 5,282,199 * | 1/1994 | Herzberg et al. ............... 370/450 |
| 5,383,186 * | 1/1995 | Shin et al. ........................ 370/452 |
| 5,506,844 * | 4/1996 | Rao ................................... 370/538 |
| 5,528,281 | 6/1996 | Grady et al. . |
| 5,572,517 | 11/1996 | Safadi . |
| 5,604,742 | 2/1997 | Colmant et al. . |
| 5,613,191 | 3/1997 | Hylton et al. . |
| 5,708,664 * | 1/1998 | Budge et al. ...................... 370/538 |
| 5,751,694 * | 5/1998 | Toft .................................. 348/15 |
| 5,793,425 * | 8/1998 | Balakrishnan ................... 348/387 |
| 5,877,814 * | 3/1999 | Reininger et al. ............... 348/500 |

OTHER PUBLICATIONS

Werner Bux, Token–Ring Local Area Networks and Their Performance, IEEE, pp. 238–256, Feb. 1989.*

* cited by examiner

Primary Examiner—Chau Nguyen
Assistant Examiner—Chiho Andrew Lee
(74) Attorney, Agent, or Firm—McDermott Will & Emery

(57) ABSTRACT

A statistical time division multiplexer facilitates distribution of data from various sources through a wireless transmission system to a plurality of subscriber stations within a cell reception area. Controlled logical token passing governs a variable token interval for data transmission from each buffer, associated in a base station with a respective receiving subscriber station, in turn to form a common data stream. Each subscriber may be assigned a minimum transmission time interval during which data, if present in the associated buffer, will be transferred. Data may be fed from the buffers in successive time intervals at bit rates that can vary from interval to interval. Variations of data transmission rate and token interval for each subscriber can be separately controlled on the basis of both presubscribed levels and current quality of service levels of the radio link. Channel quality and/or bit error rate for each channel may be fed back dynamically from the user for each token interval.

13 Claims, 6 Drawing Sheets

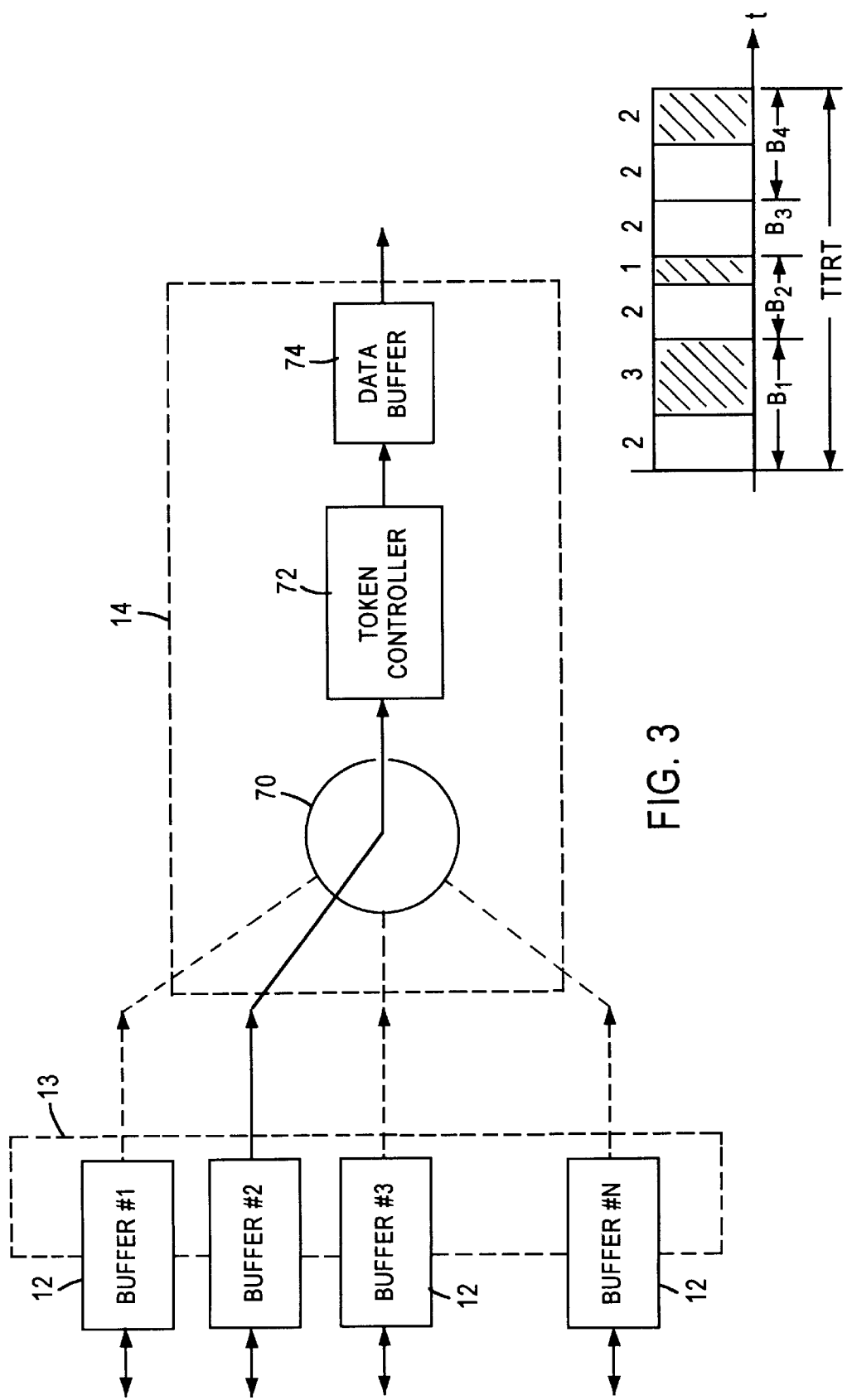

STATISTICAL TIME DIVISION MULTIPLEXER FOR A WIRELESS ASYMMETRIC LOCAL LOOP COMMUNICATION SYSTEM

CROSS-REFERENCE TO RELATED APPLICATION

This application is related to copending application Ser. No. 08/972,250, filed Nov. 18, 1997, entitled "WIRELESS ASYMMETRIC LOCAL LOOP COMMUNICATION, " commonly assigned with the present invention.

TECHNICAL FIELD

The present invention relates to data communication and more particularly to wireless asymmetric broadband delivery of data, through statistical time division multiplexing techniques, to a plurality of subscriber locations from a common wireless transmission source.

BACKGROUND OF THE INVENTION

The increasing availability of information in the form of data from various sources has spurred large public demand for broadband data transfer that challenges the capabilities of communication delivery systems. The number of information sources publicly and interactively available via the internet to personal computers, as well as private data network sources, continues to proliferate. Full motion video programming and source material also has rapidly progressed from early television broadcasting and cable distribution networks to a wide variety of distribution arrangements, including direct broadcast satellite television. The number of full motion video sources has expanded in response to increased usage and user demand for a greater range of subject matter content.

To meet user requirements, more robust broadband networks have evolved. For example, Litteral et al. U.S. Pat. No. 5,247,347 discloses a digital video distribution network providing subscribers with access to multiple Video On Demand service providers through the public switched telephone network. The subscriber may transmit ordering information via the public switched telephone network to the independent video information providers. Video programming may be accessed and transmitted to the subscriber directly from a video information provider (VIP) or through a video buffer located at a central office (CO) serving the subscriber. Connectivity between the central office and the subscriber for transmission of video data is provided by an asymmetrical digital subscriber line (ADSL) system. ADSL, which has been standardized by ANSI as T1.413, uses existing unshielded twisted pair copper wires from the telephone company central office to the subscriber's premises. Equipment at the central office and the subscriber's premises permits transfer of more high speed digital information signals to the subscriber than in the reverse direction. In the Litteral et al. patent, ADSL interface units at the central office multiplex digital video information with voice information to be transmitted to the subscriber and support two-way transmission between the subscriber's line and the X.25 packet data network of one or more control channels. A complementary ADSL interface unit at the subscriber's premises separates downstream video control signals and voice telephone signals from the line and multiplexes upstream control signals and voice telephone signals onto the line. A similar public switched telephone network multimedia information ADSL delivery system is disclosed, for example, in U.S. Pat. No. 5,528,281 to Grady et al.

A number of patents have proposed various schemes for wireless distribution of information. Hylton et al. U.S. Pat. No. 5,613,191, for example, describes provision of interactive multimedia services including broad band video and audio data and control signals in a multiplexed form to subscriber premises via a communications link from a plurality of information providers. Real time encoders receive video programs and encode the information for those programs into packets of compressed digital data, e.g., in accord with a recognized video compression standard. The head end may also receive previously encoded video program material from other sources, such as a digital server or a digital transmission media. Multiplexers combine digital data for groups of programs into the multiplexed packet data streams. A digital modulator, such as a 64 or 256 QAM modulator, modulates each digitally multiplexed packet data stream for transport in one unique channel. A combined spectrum signal containing these channels is delivered to the subscribers' premises through suitable multimedia distribution and delivery architecture. The combined spectrum signal channel is connected to a network interface at the subscriber premises where it is up-converted to place the channels into available frequency channels in the UHF range. The unique channel from each digital modulator is fed to an up-converter synthesizer module which performs a frequency hopping spread spectrum technique. At the receiver site within the premise an antenna receives a signal which is then down-converted and supplied to a wireless signal processor. The wireless signal processor, typically part of an interface module connected by a cable to the down-converter, processes the received wireless signal to select one of the channels.

While developments such as the systems described above have advanced communication capabilities, limitations remain with respect to meeting the increasing requirements relating to volume of transmission, efficiency and flexibility. Network based systems that deliver data over twisted pair copper wire, even under ADSL communication conditions, are bandwidth limited.

The network data packet transmission modes, such as ATM and the like that have been developed to transport large quantities of video data with high speed and flexibility, contain significant cell overhead that dilutes the proportion of data information payload. ATM networks communicate all information in cells that comprise a well defined and size-limited header area and a user information, or payload, area. CCITT.121/2, the standardized ATM cell format, specifies a 5-byte header field and a 48-byte information or payload field. The header field carries information pertaining to ATM functionality, such as identification of the cells needed for routing purposes. Transfer is asynchronous in the sense that the recurrence of cells that contain information from any particular sender is not necessarily periodic. Each sending device using the ATM network submits a cell for transfer when it has a cell to send, not in accordance with a transmission time slot assigned to the device. The cell overhead is required to enable the ATM switch, or a plurality of ATM switches throughout the network, to rout the transport of cells within the switch and to translate the header information in the cells for appropriate routing of the succeeding ATM cell receiving element.

Wireless communication is less restrictive than the twisted pair wire plant insofar as bandwidth is concerned and does not require the cell overhead of network data transmission arrangements. Thus, cells received over the data network can be stripped of substantial cell overhead for wireless transmission over the subscriber final link. With wireless transmission, however, the signal strength of the radio link is subject to variation with physical conditions and distance. The quality of service of such data transmission thus can be degraded to an unacceptable bit error rate, particularly with transmission at high data rates. Without cognizance of the signal strength and bit error rate over each subscriber radio link, quality of service cannot be accurately assured.

The above-referenced commonly assigned copending application (Attorney Docket 680-224) addresses the shortcomings of prior systems by providing a wireless, cellular radio link for broadband data distribution from a base station to a plurality of subscriber stations within the cell reception area. Buffers in the base station, associated with respective subscribers, collect the requested data from the information providers for transmission by the base station in a statistical time division multiplexed (STDM) fashion, whereby each subscriber may be assigned a minimum transmission time interval during which data will be transferred from the associated buffer.

In order for such an arrangement to service multiple individual recipients of wireless signals from a given transmission source who may require different levels of transmission quality and different data throughput rates, collectively referred to herein as quality of service levels, an efficient and flexible STDM multiplexer is essential. For example, subscribers who are to receive real time video data would require a greater throughput rate and lower bit error rate than subscribers to whom text is to be downloaded for storage. Other users may require each of these modes at different times but have no avail for subscribing to different quality of service levels on a scheduled or dynamic basis. The ability to transmit at high bit rates with low bit error rates is dependent upon transient physical conditions. An STDM controller should be able to accommodate, to the greatest extent possible, existing factors such as current user activity, current requirements of various users, and transmission quality conditions.

For example, if the transmission quality becomes degraded in the link to a user who needs high throughput with a low bit error rate, adjustment must be made if the required levels are to be maintained. Such adjustment may involve transmission at a lower bit rate for a longer transmission time interval. The throughput can thus remain the same while the lower transmission bit rate should provide a better bit error rate. The longer transmission time interval for that user can be obtained if a correspondingly shorter transmission time interval can be distributed among other system users. This objective can be realized if there are less than the maximum number of users active. At less than full system capacity, transmission time that would have been allocated to the non-active users is free for use by others. Another adjustment possibility would be to allocate shorter transmission time intervals to users having less stringent transmission throughput requirements to balance the increased transmission time required by the high throughput user, while remaining within the limits of system transmission capacity. Shorter transmission times for other users can also be accomplished by increasing the transmission bit rates for those users, if their transmission link quality is high or their bit error rate requirements are relatively low. The STDM thus should be capable of adjusting, on a dynamic basis, the bit rates and transmission time intervals of all users at any given time if it is to meet all users' requirements, including those video users with the more stringent requirements.

DISCLOSURE OF THE INVENTION

The present invention meets the above challenges in part by providing a statistical time division multiplexer in which controlled logical token passing governs a variable token interval for data transmission from each buffer in turn to form a common data stream. Each subscriber may be assigned a minimum transmission time interval during which data, if present in the associated buffer, will be transferred. Users thus can presubscribe to desired data throughput rates.

A further advantage of the present invention is that data may be fed from the buffers in successive time intervals at bit rates that can vary from interval to interval. The data stream is output as radio signals from a radio tower, each subscriber being equipped to receive that portion of the stream with which it is identified. The invention thus provides great flexibility in supplying individual user data throughput capacity, as each subscriber data transmission bit rate as well as its token transmission time interval, can be controllably varied.

A further advantage of the present invention is that variations of data transmission rate and token interval for each subscriber can be separately controlled on the basis of both presubscribed levels and current quality of service levels of the radio link. Channel quality and/or bit error rate for each channel may be fed back dynamically from the user for each token interval. The invention thus takes into account quality of service considerations related to the strength of the radio link, which depends on the transmission path operation (e.g., lack of interference, distance, etc.) at any instant, and the contracted minimum data transmission level. The latter has direct bearing on how the token interval length is controlled for the subscriber. Both considerations may impact the data rate within the token interval. The system has the flexibility to change the contracted level on a scheduled or dynamic basis.

BRIEF DESCRIPTION OF DRAWINGS

FIG. 3 is a block diagram illustrative of the logical interaction among a statistical time division multiplexer and buffer arrangement in accordance with the present invention.

FIG. 4 is a waveform for the statistical time division multiplexing scheme of FIG. 3.

FIG. 8 is a flow chart of operation for determining token holding time in the flow chart of FIG. 7.

DESCRIPTION OF THE PREFERRED EMBODIMENTS

The statistical time division multiplexing arrangement of the present invention has particular relevance in the wireless asymmetrical communication system disclosed in the inventor's copending patent application previously identified herein. It is to be understood that the invention has general utility and considerable advantages in other systems requiring distribution of data to a plurality of destinations on a time shared basis.

Figure 1:
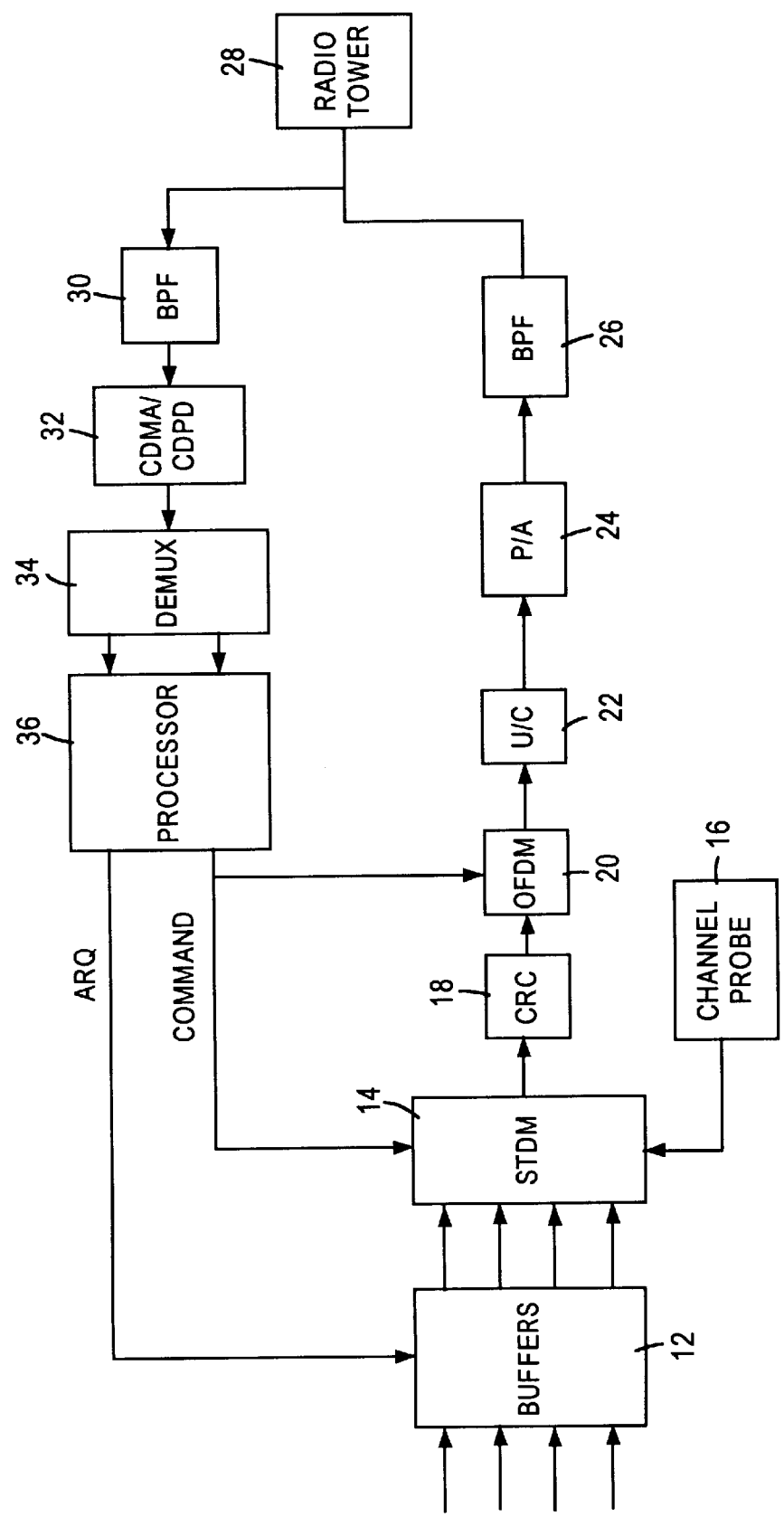
FIG. 1 is a block diagram of a wireless asymmetric local loop transmission base station arrangement in which the statistical time division multiplexer of the present invention may be incorporated.

FIG. 1 is a block diagram of a base station. Buffers 12 have inputs for receiving data from information providers at constant or variable bit rates. Such data may have been transported, for example, via the internet and/or private data network. One or more buffers is associated with a respective subscriber having a location in the cell reception area of the base station. Incoming data from an information provider for that subscriber may be initiated in a direct request by the subscriber or via an external source. For example, data may be received via the internet under TCP/IP or other network level control. The buffers have an additional input from processor 36.

The outputs of buffers 12 are supplied to statistical time division multiplexer STDM 14, which additionally is supplied input signals from processor 36 and from channel probe 16. The channel probe generates pulses that can be added to each channel to enable the destination to determine the strength of the signal channel. The output of STDM 14 is fed to cyclic redundancy check CRC 18, which adds forward error correction data. The output of CRC 18 is fed to orthogonal frequency division multiplexer (OFDM) 20, which additionally is connected to receive an input from processor 36. The OFDM modulated output is up converted in converter 22, passed through a power amplifier 24, then through band pass filter 26 and out to the radio tower 28, these elements collectively comprising a cellular wireless transmitter of the high data bandwidth portion of ADSL communication.

Signals received from cellular subscribers by the radio tower are fed to band pass filter 30. These signals are lower data bit rate signals that may comprise voice signals as well as data signals that are indicative of the quality of the radio link. These signals are more fully described hereinafter. The frequency band for these signals preferably are in the PCS range but can also be in the cellular range. Data are recovered from the signals received from the band pass filter 30 by processor 32 in accordance with the particular cellular communication scheme utilized. For example, digital communication from cellular subscribers may take the code division multiple access (CDMA) circuit switched format, or, alternatively, the cellular digital packet data (CDPD) standard. Concomitant voice signals, if any, can be separated from data signals and communicated through conventional network or wireless schemes.

The data portion of the signals received at the base station conveys the channel quality of the forward link as monitored by the subscribers. Quality may comprise two components, the signal strength of the individual OFDM subcarriers and the bit error rate performance obtained from the CRC error correction data received at the radio tower. Standard error checking detection methodology provides for generation of an Automatic Retransmission request (ARQ) signal upon detection of an error. The data signals are fed to demultiplexer 34, which outputs quality of service metrics derived from the respective probe signals and ARQ signals to quality of service processor 36. The ARQ signals are indicative of error detection obtained from CRC data. The probe signals represent the channel signal strength and/or dispersion. Processor 36 has an additional input (not shown in the drawing figure) for receiving data indicative of subscribed level of service for the associated subscriber. The processor thus provides a measure of the bit error rate, obtained from the ARQ signals, and of the wireless channel transmission quality, obtained from the probe feedback signals, to derive a quality of service metric to be compared against the quality of service contracted with each subscriber. Control signals, if appropriate, are responsively output by the quality of service processor 36. ARQ signals are applied to the buffers to enable the buffers to retransmit data corresponding to the detected errors, should such data remain in the buffers without having been rewritten. If necessary, ARQ signals can be transmitted back to the information provider, in conventional manner, for retransmission of data from the source. Signals are output to the STDM and OFDM by the processor 36 for regulation of the bit rate of the buffer outputs, the transmission interval duration set by the STDM, and the QAM bit rate. Reference is again made to copending application (Attorney Docket 680-224) for further description of OFDM operation.

Figure 2:
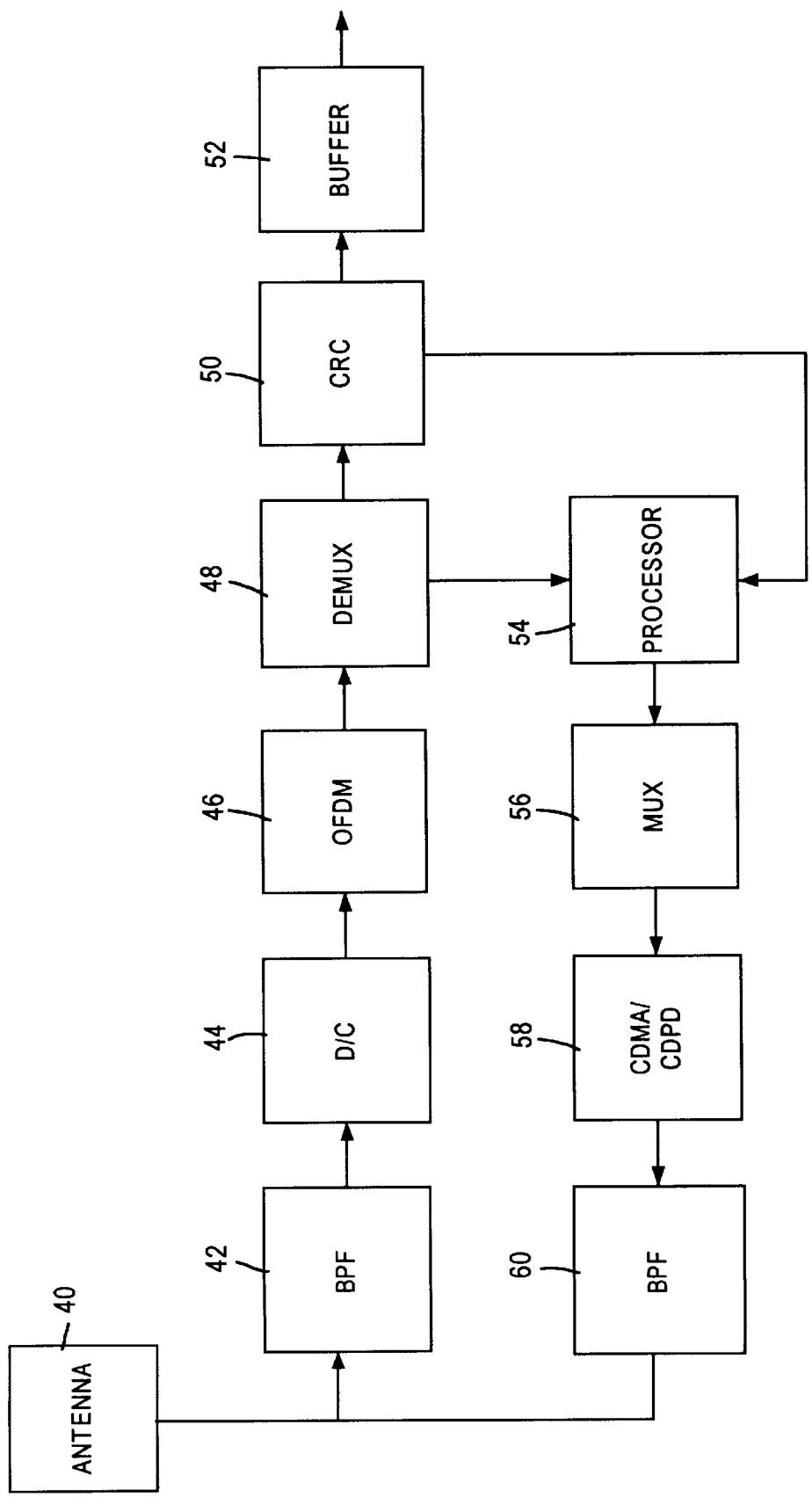
FIG. 2 is a block diagram of a wireless asymmetric local loop transmission subscriber station arrangement that may be used for communication with the base station of FIG. 1.

FIG. 2 is block diagram representative of the elements of a subscriber station. Antenna 40 preferably may be an array antenna, for example, an adaptive phased array antenna, that can adjustably direct its beam toward the base station depending upon desired quality of service. For a better quality of service, the beam can be narrowed down and focussed on the base station to maximize signal strength without increasing the effective radiated power from the base station. Signals received by the antenna are fed to band pass filter 42, down converted by converter 44, fed to OFDM demodulator 46, and demultiplexed in de-mux 48. De-mux 48 outputs data to be error checked by CRC block 50, the data then fed to buffer 52. The data are input to this buffer at a variable rate as the whole system is time-shared. The buffered data is then applied in accordance with the user's requirements.

Channel probe feedback signals are applied to channel assessment processing unit 54, which has an additional input to receive bit error data from CRC 50. Unit 54 output data is multiplexed at MUX 56, combined with voice signals, if any, in CDMA or CDPD processing unit 58, and fed to band pass filter 60. The resulting signals are transmitted back to the base station by antenna 40.

In operation, a subscriber may request a download of information, for example, from a particular web site, via wireless or other communication. The information provider will feed data over a land line, such as the internet or private data network, at a constant or variable bit rate to the base station. From header information, the base station identifies the buffer associated with the subscriber and strips unnecessary overhead data. TCP/IP or the like protocol insures that the buffer will not be overloaded by interrupting, when appropriate, the transmission from the information provider. Each user may require a particular data throughput rate and quality of service, depending on individual needs and the type of data to be delivered. Thus, the user is provided with options for preselecting quality of service and rate levels upon subscribing.

As the system is time shared, a plurality of buffers, up to the system capacity, simultaneously may contain data to be delivered to different subscribers. The timed interaction among the plurality of base station input buffers, whose outputs are multiplexed to a common broadband channel data stream, can be understood with reference to the block diagram of FIG. 3. In accordance with the present invention, statistical time division multiplexer (STDM) 14 comprises elements that are diagrammatically represented by commutator 70, token controller 72 and data buffer 74. To accommodate different subscriber options while multiplexing data from respective buffers, the transmission time interval as well as the output data bit rate, for each buffer is separately adjustable. By way of example, the invention can be constructed to handle bit rates of up to 80 megabits per second.

The multiplexed time interval for transfer of data for each of buffers #1 through #N is controlled via commutator 70 with a timed token passing protocol, for example, the FDDI logical token ring standard, which is conventionally defined for a variable length protocol data unit. Token passing is illustrated by the plurality of connections between the commutator and buffers, the solid line connection indicating that buffer #2 currently has the token for passing data through the commutator to the data buffer of the multiplexer.

The token controller determines the length of time each respective buffer has for sending data after "capturing" the token. This time interval is referred to hereinafter as the token holding time (THT). It is to be understood that the dotted line depiction 13 of the logical token ring in FIG. 3 signifies the logical time transfer of the buffers in sequence, and does not represent a physical connection ring of buffers, such as the physical layer of remote stations in an FDDI network. The token controller defines a constant target token rotation time (TTRT) during which the token passes through an entire sequence of all buffers. The TTRT ensures that the latency period, or time duration between successive possible data transfers from any respective buffer, will be limited to an acceptable level. The TTRT preferably can be set dynamically to meet the most stringent requirements of all subscribers whose respective buffers are currently active. While the TTRT is relatively fixed, the time interval within the TTRT that each buffer can transmit data is variable. The token controller also can set the transmission data bit rate individually for each buffer during its token interval. This variability can accommodate subscribers' different individual throughput and quality requirements. Each transmission interval can also be adjusted in accordance with the number of buffers that contain data to be transferred during the TTRT. If some buffers do not contain data, a greater portion of the target interval is available for the transmission by the other buffers.

The waveform of FIG. 4 is an illustration of the token ring protocol as applicable to STDM in the present invention. To simplify explanation, it is assumed by way of example that data from four buffers ($B_1$–$B_4$) are to be multiplexed. Preferably, the TTRT is set to one half the minimum latency interval, based on the requirements of users that are currently active. The TTRT, which in the illustrated example is fourteen msec., is apportioned among the four input buffers. It is assumed, for ease of explanation, that each buffer requires a minimum token holding time (THT) of 2 msec. The THT for each buffer is thus at least the minimum 2 msec. plus a share of the remaining portion of the TTRT, the additional allocations being indicated as shaded portions in the diagram. As illustrated, the THT for buffer $B_1$ is the minimum 2 msec. plus an additional 3 msec., the THT for buffer $B_2$ is the minimum 2 msec. plus an additional 1 msec., the THT for buffer $B_3$ is the minimum 2 msec., and THT for buffer $B_4$ is the minimum 2 msec. plus an additional 2 msec. In the next token passing sequence, the excess TTRT portion may be distributed among the buffers differently, so long as minimum subscribed THTs are guaranteed. Of course, subscribed minimum THTs may vary individually with each user and need not all be set for the same time duration.

Figure 5:
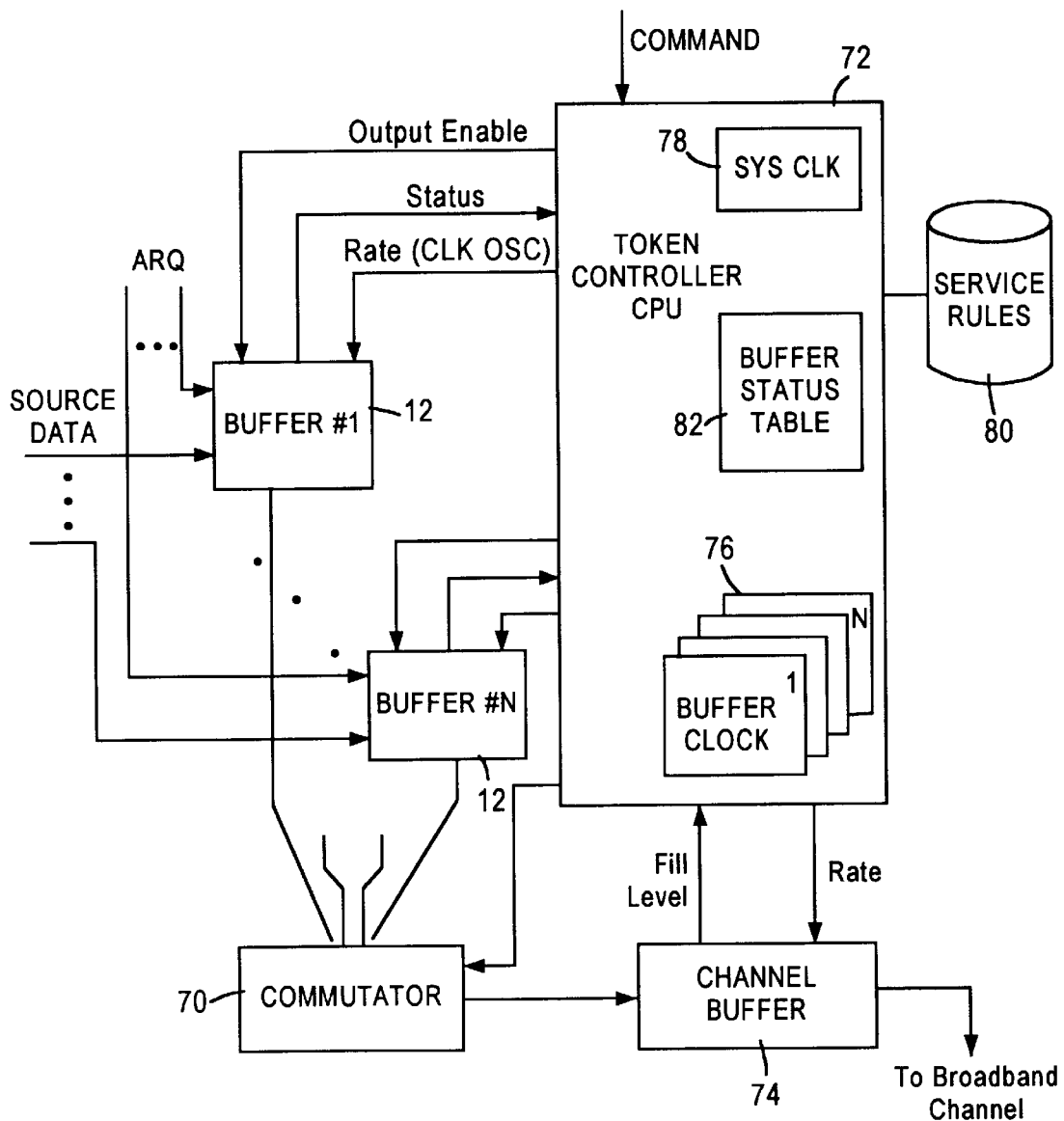
FIG. 5 is a more detailed block diagram of a preferred embodiment of a statistical time division multiplexer in accordance with the present invention.

FIG. 5 is a more detailed block diagram of a preferred embodiment of a statistical time division multiplexer in accordance with the present invention. Buffers 12 are assigned to individual users for subscribed time periods. Incoming source data are identified with respective subscribers and input to the associated buffers. Each buffer outputs data through commutator 70 and channel buffer 74 to the common broadband channel under control of token controller 72. The token controller, which may include a CPU or the like, is connected to each buffer by an output line through which an output enable signal can be passed. An additional line from the token controller to each buffer carries a clock rate signal for determining the buffer output data bit rate. Clock rate signals are thus delivered to the buffer during its THT for reading out data in conventional manner. The token controller also has an output line to the commutator for passing thereto buffer address signals. Token passing, i.e., the sequence of THT intervals during which data transmission of associated buffers occurs, takes place through the application of an output enable signal from the token controller to the appropriate buffer and application of the address identification of that buffer to the commutator. The commutator thus effects a logical switch functionality, connecting the buffer identified by the address to the channel buffer.

The token controller contains a resettable buffer clock 76 for each buffer 12. System clock 78, which continuously generates pulses, provides timing signals for the buffer clocks and other STDM functions, such as data output rates. Initiation of an output enable signal causes reset of the associated buffer clock at the start of the token holding time of the buffer. The output enable signal is delivered to the buffer and its address is sent to the commutator. At the end of the THT, data output from the buffer is disabled by cessation of the output enable signal from the token controller. The token is passed to the next buffer in the token sequence. Similar operation takes place for each token passing interval, the buffer clock for each buffer being reset at the start of its THT.

Buffer status table 82 keeps track of whether or not each buffer contains data for transmission. A bit in the table is set appropriately for each buffer in response to a status signal received therefrom. If no data remains in a buffer to be transmitted, the token controller adjusts the token passing sequence accordingly. For inactive buffers, while no transmission occurs, the clocks will be reset in turn as the token is passed to the next buffer for data transmission. The rotation sequence preferably thus will remain the same and include all buffers, although token passing effectively skips through inactive buffers.

Service rules, which may be in the form of a data base, provide reference criteria for the token controller from appropriate storage 80. Service rules include subscribed quality levels for each user that may be changeable by request or varied according to an established schedule. User throughput requirements, such as minimum THT, bit rates and bit error rates, and maximum latency values may be specified. The token controller accesses these stored rules for dynamically determining TTRT for each sequence, individual THTs during a TTRT sequence, and buffer output data bit rates. These determinations are also affected by feedback signals generated by the data delivery system, such as quality of service processor 36 of FIG. 1. These signals are delivered through a line indicated as "command" in FIG. 5.

In accordance with the invention, token intervals and transmission data bit rates can be adjusted for current physical conditions in the wireless link as well as for the subscribed levels. A portion of each token interval can be reserved for transmission of signals generated by channel probe 16 (FIG. 1). These signals can be closely spaced repetitive pulses that can be returned from the subscriber station as the feedback signals from which the quality of service processor 36 can determine whether the transmission bit rate and/or token interval for a respective subscriber should be adjusted in light of the current physical link conditions and the subscribed quality of service level. For example, when the quality of the wireless transmission link with a particular subscriber station is poor, channel assessment processing unit 54 will process the received demultiplexed probe signals and CRC data to provide the feedback signals transmitted back to the base station. The quality of service processor 36, which contains data indicative of that subscriber's contracted quality of service level, then makes appropriate adjustments. The processor, in response to an unacceptably high bit error rate, may adjust the QAM symbol size of OFDM 20 to a lower level.

To avoid overload of the channel data buffer in the STDM 14 that may result from this correction, further adjustments may be necessary to data flow operations from the respective buffer 12. Such adjustments may comprise some combination by which the data bit rate or the token transmission interval for the subscriber's buffer is decreased to obtain the acceptable level of bit error rate without STDM buffer overload. The token controller, in order to effect these ends, has two communication lines to the channel buffer. A first line permits reporting of the channel fill level to the token controller. The second line permits the token controller to set the output rate of the channel buffer to the broad band channel. If command signals received by the token controller indicate that the QAM symbol size must be decreased to cope with physical transmission conditions, the channel buffer rate will be lowered by the token controller accordingly to avoid downstream overload. The channel buffer fill level feedback provides a measure of whether the controller must reduce the average data output from the buffers to avoid exceeding the channel buffer capacity.

If the subscriber requires a high throughput rate, processor 36 may determine that the token transmission time interval may be increased while the transmission data bit rate for that buffer may be decreased to maintain acceptable levels. In the multiplexed environment, contract levels of the various subscribers, their data transmission activity at the particular time, and the quality of their wireless channel links, are factors with which processor 36 can account in its adjustment process. A lack of activity and/or high transmission link quality relating to other subscriber stations may permit decreases in the token transmission time intervals for those stations, thereby allowing a concomitant increase in token time for the subscriber station having a poor signal strength link. Activity may be sufficiently low to permit assignment effectively of a plurality of token intervals in a TTRT sequence to the station, whereby sufficient throughput at low bit error rate can be delivered. The token controller thus can make the appropriate adjustments until normal conditions resume.

Figure 6:
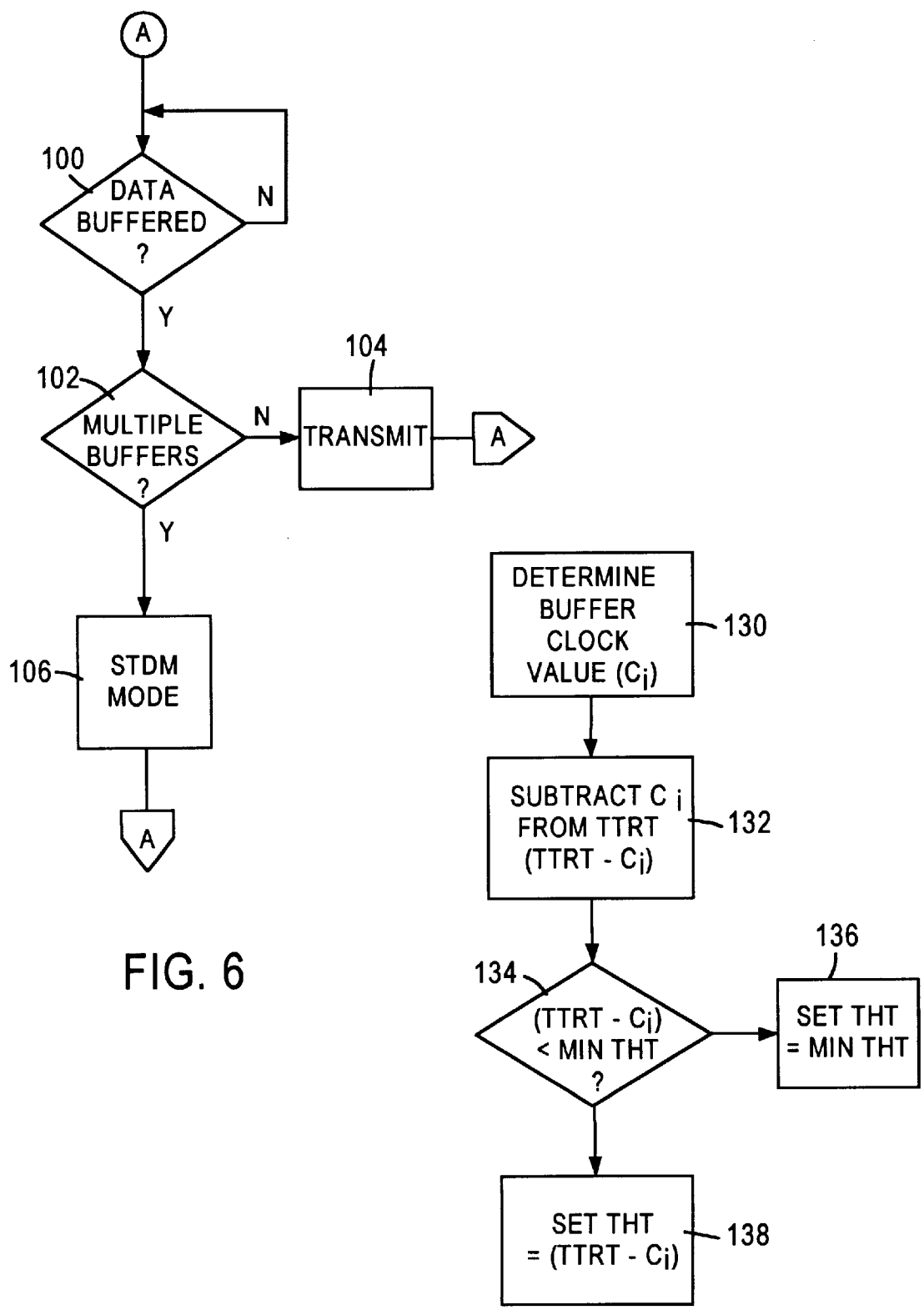
FIG. 6 is a flow chart of data transmission operation in accordance with the present invention.
Figure 7:
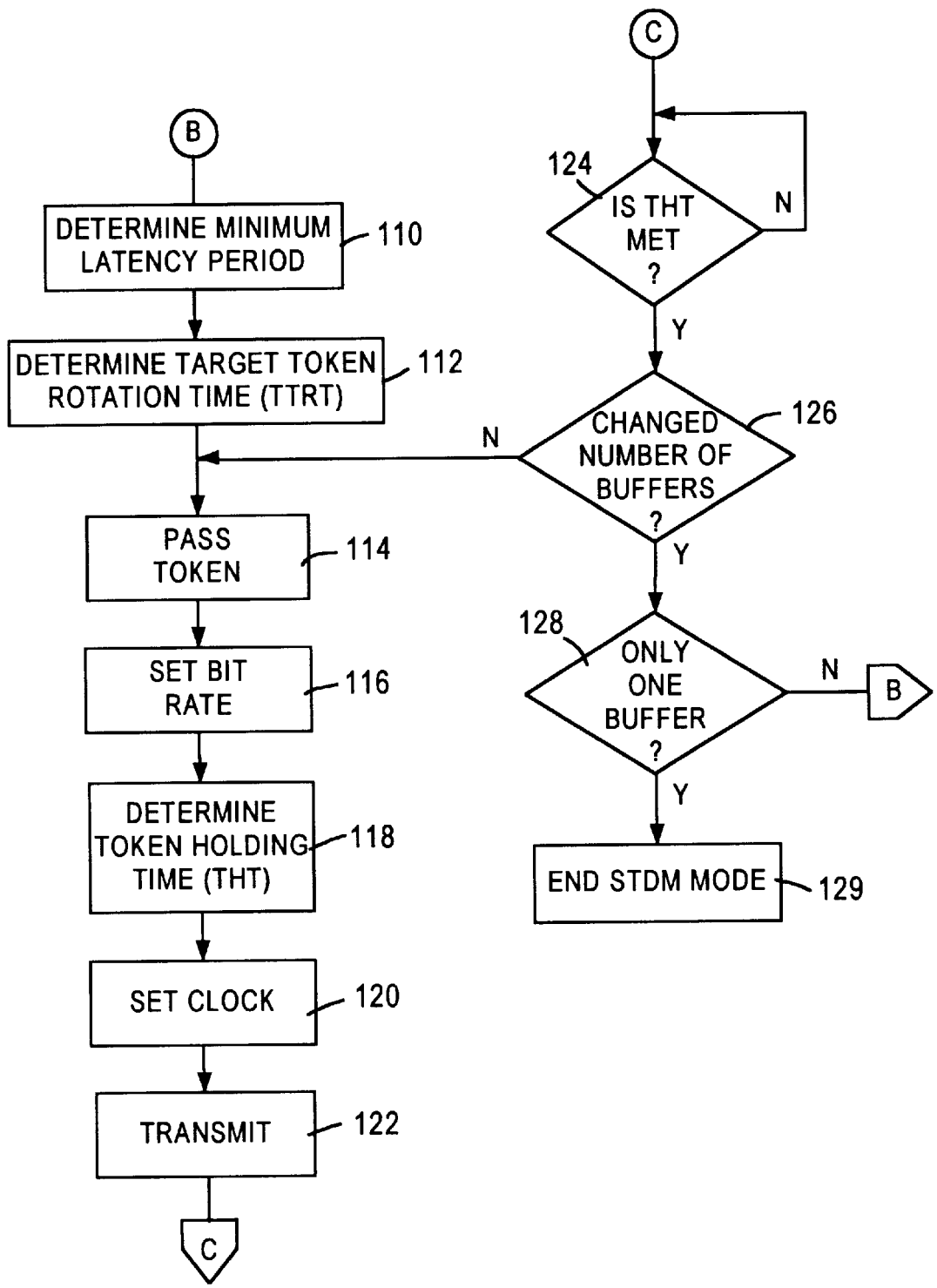
FIG. 7 is a flow chart of operation of the STDM mode step in the flow chart of FIG. 6.

FIGS. 6 through 8 are flow charts of a preferred STDM data transmission operation embodiment in accordance with the present invention. At step 100, the buffer status table of the token controller is checked to determine whether any of buffers 12 have received source data. If so, step 102 determines whether a plurality of buffers have data for transmission. If only one buffer is active, data from this buffer is continuously transmitted in step 104 while steps 100 and 102 are repetitively performed by referencing the buffer status table. If step 102 indicates that more than a single buffer contains data, the statistical time division multiplexing (STDM) mode takes place at step 106. Flow charts for this mode are shown in FIGS. 7 and 8. At the termination of step 104, operation reverts to step 100.

At the outset of the STDM mode, the token controller accesses the service rules at step 110 (FIG. 7) to determine the minimum latency period. This determination is dependent on the subscriber levels stored for those buffers that currently contain data to be transported. At step 112, the token controller determines the target token rotation time (TTRT), i.e., the time interval during which the token is passed for a complete sequence through all buffers. The TTRT is dependent upon the minimum latency period, the number of active buffers, and minimum THT requirements. At step 114, the token controller "passes" the token to a buffer. This step comprises the logical identification of a buffer that currently has the opportunity to send data through the commutator to the channel buffer for output to the broadband channel. At step 116, the token controller sets the bit rate for the buffer based on identified factors, which may include stored service rules data and quality condition feedback. At step 118, the token controller determines the token holding time (THT) for the current token interval. Operation for this step is described in more detail hereinafter with respect to the flow chart of FIG. 8. If the buffer does not contain data to be transmitted, its determined THT is zero. At step 120, the buffer clock for the buffer logically "holding" the token is set to zero, whereupon transmission of data from the buffer commences at step 122.

Transmission of data from the buffer continues in step 124 until the THT interval has elapsed. At step 126, determination is made as to whether there has been a change in the number of buffers holding data. If not, operation proceeds to step 114, wherein the token is passed to the next buffer in the sequence. If there has been a change in the number of active buffers, a determination is made at step 128 as to whether the current buffer is the only remaining active buffer. If so, the STDM mode ends at step 129 and reverts to step 100, whereupon continuous transmission will occur until all data has been transmitted or at least one additional buffer receives source data. If it is determined at step 128 that a plurality of buffers are currently active, inasmuch as the number of such buffers has changed, operation reverts to step 110 for renewed determination of minimum latency period and TTRT before the token is again passed.

The process for determination of the token holding time (THT) for each buffer during normal transmission service quality conditions is illustrated by the flow chart of FIG. 8. At step 130, determination is made of the respective buffer clock value at the time the token is passed to the buffer. This value, indicated $C_i$ in FIG. 8, is a measure of the time that has elapsed since that buffer last initiated data transmission, inasmuch as the buffer clock is set to zero, i.e., reset, at the beginning of the token holding interval. At step 132, the $C_i$ time value is subtracted from the TTRT for the token passing sequence. The token controller can access the service rules to obtain the minimum THT value. If the difference (i.e., TTRT−$C_i$) is less than the minimum THT for the associated buffer, as determined at step 134, then the THT is set equal to the minimum THT at step 136. If it is determined in step 134 that the difference in the subtraction step performed in step 132 is equal to or exceeds the respective minimum THT, then the THT is set equal to the value of the difference at step 138.

The ability of this THT determination method to provide statistical variation of transmission time division multiplexing among buffers is illustrated by the following example. For simplicity, it is assumed that four buffers are active, that each buffer has a subscribed minimum THT of 2 msec., and the maximum latency period is 24 msec. The TTRT thus will be set for 12 msec. and THT distribution among the buffers $B_1$–$B_4$ will be made in accordance with the following table, in which $C_1$–$C_4$ represent respective buffer clock values. It is further assumed that all buffers become active together and that their buffer clocks are initialized together.

| $C_1$ | $THT_1$ | $C_2$ | $THT_2$ | $C_3$ | $THT_3$ | $C_4$ | $THT_4$ |
|---|---|---|---|---|---|---|---|
| 0 | 12 | 12 | 2 | 14 | 2 | 16 | 2 |
| 18 | 2 | 8 | 4 | 10 | 2 | 10 | 2 |
| 10 | 2 | 10 | 2 | 8 | 4 | 10 | 2 |
| 10 | 2 | 10 | 2 | 10 | 2 | 8 | 4 |

At the outset, with the token passed to buffer $B_1$, its token holding time is determined to be equal to the TTRT of 12 msec. minus the clock value of zero msec. $THT_1$, thus is set for 12 msec. During the remainder of the first token passing sequence, each of the buffer clocks will be at least equal to the TTRT, i.e., the sum of the previous THTs in the sequence. Thus, the token holding times for each of the remaining buffers will be set to the respective minimum THT levels, or 2 msec. Each buffer clock will be reset to zero at the beginning of the respective transmission interval.

In the next sequence, the buffer clock value for the first buffer will have advanced 18 msec. when the token is received. $THT_1$ thus is set for the minimum 2 msec. $C_1$ is reset at this time. When the token is next passed to buffer $B_2$, its clock will have an elapsed time of 8 msec. as each of the previous four buffers will have had transmission intervals of 2 msec. $THT_2$ thus will be set for 4 msec. as $C_2$ is reset to zero. As exemplified by the table, operation continues in this manner with the excess TTRT time being allocated to different buffers in successive token passing sequences. It is to be understood from the flow chart of FIG. 7 that the TTRT and minimum THT levels are subject to change as different combinations of buffers are active at any time or the subscribed levels are replaced. The minimum THT levels may differ among the various buffers that receive the token during a sequence. Moreover, the token controller CPU will superimpose changes to token holding times that become necessitated by quality transmission level feedback data as earlier described.

In this disclosure there is shown and described only the preferred embodiments of the invention and but a few examples of its versatility. It is to be understood that the invention is capable of use in various other combinations and environments and is capable of changes or modifications within the scope of the inventive concept as expressed herein. For example, a high requirement user may be assigned a plurality of buffers with a corresponding number of THT intervals in a TTRT sequence. Similarly, a user that subscribes to twice the minimum THT than other users may be assigned a single buffer that would be passed the token twice during the TTRT sequence. A combination of such provisions could provide shorter latency period for a high requirement user while enabling a relatively longer TTRT for servicing a greater number of active buffers.

What is claimed is:

1. In a broadband data communication system, a statistical time division multiplexer (STDM) for concurrent transmission of broadband data signals individually to a plurality of users at respective remote locations, said STDM comprising:

a commutator having a plurality of input data paths each connected to a source data buffer associated with each of said plurality of users, and an output data path;

a channel buffer having an input connected to the output data path of said commutator for receiving therefrom a stream of multiplexed source data transferred from said source data buffers, and an output connected to a broadband distribution channel; and a controller having a plurality of output enable lines each respectively connected to a respective one of said source data buffers for individually enabling the respective source data buffer to output data to its connected commutator input data path, said controller being connected to said commutator for delivering thereto an address signal identifying an enabled source data buffer, wherein said controller is responsive to stored service rules identifying transmission requirements of said users to vary individually intervals of data transmission from said source data buffers to said stream of multiplexed data; and wherein said controller comprises:
      a plurality of resettable buffer clocks associated with respective ones of said source data buffers;
      a system clock to which said buffer clocks are referenced; and
      a processor for setting said intervals of data transmission in accordance with values read from said buffer clocks.

2. A statistical time division multiplexer as recited in claim 1, wherein said controller further comprises:

an input connection for receiving the data status of each of said source data buffers;

and a buffer status table for storing the status of each source data buffer in response to receipt of status signals therefrom at said input connection;

whereby source data buffers are identified for transmission of data to said stream of multiplexed data.

3. A statistical time division multiplexer as recited in claim 2, wherein said controller further comprises a clock rate output for connection to respective data source buffers, whereby the transmission output data bit rate for each of said data source buffers is controllably varied.

4. A statistical time division multiplexer as recited in claim 3, wherein said controller further comprises a command signal input for receiving signals indicative of transmission quality conditions in said broadband data communication system.

5. In a broadband data communication system, a method for concurrently transmitting data from a plurality of data source buffers to a plurality of users at remote locations that are individually associated with said data source buffers, said method comprising:

determining whether data currently exist in more than one of the plurality of buffers;

allocating repetitive data transmission time intervals respectively to said plurality of buffers;

setting a transmission data bit rate individually for each of said buffers for its transmission time interval;

multiplexing data from each of the buffers into a common data stream; and varying the length of said data transmission time intervals on an individual basis in accordance with established criteria for said plurality of users, wherein one element of said criteria is each user's acceptable time period of latency between successive data transmissions to the respective user; and wherein said allocating step comprises:

passing a transmission token in a logical ring sequence to each of said plurality of buffers to establish a token holding time (THT) that defines a respective transmission time interval for each said buffer;

determining a minimum latency period for those buffers comprised by the token passing sequence;

setting a target token rotation time (TTRT) duration for a complete token passing sequence in accordance with said minimum latency period;

adjusting the THT for each buffer in said sequence; and repeating the token passing sequence while data remain in more than one of said buffers.

6. A method as recited in claim 5, wherein said adjusting step for each buffer having data for transmission comprises:

determining a respective minimum THT from said established criteria;

reading a current value of an associated buffer clock;

subtracting the current associated buffer clock value from said TTRT;

comparing the difference obtained in said subtracting step to said respective minimum THT; and setting the THT equal to said difference if said difference is greater than said respective minimum THT.

7. A method as recited in claim 6, further comprising the step of resetting said associated buffer clock value at the start of the THT for the respective buffer in each TTRT sequence.

8. A method as recited in claim 7, further comprising the step of setting the THT equal to said respective minimum THT if said difference is less than said respective minimum THT.

9. A method as recited in claim 5, wherein said adjusting step for each buffer having data for transmission comprises:

receiving signals indicative of quality of transmission in said broadband communication system; and varying the respective buffer THT in accordance with the received signals.

10. A method as recited in claim 5, further comprising the step of applying said common data stream to a channel buffer; and said adjusting step comprises:

receiving signals from said channel buffer indicative of a data fill level therein; and varying the respective buffer THT in accordance with the received signals.

11. A method as recited in claim 9, further comprising the step of varying said transmission bit rate in accordance with said received signals.

12. A method as recited in claim 10, further comprising the step of varying said transmission bit rate in accordance with said received signals.

13. A method as recited in claim 9, wherein one element of said criteria is maximum bit error rate and said signals received in said receiving step relate to transmission bit error rate in said broadband system.

* * * * *